United States Patent
Wlodarczyk

[11] Patent Number: 6,122,971
[45] Date of Patent: Sep. 26, 2000

[54] INTEGRATED FIBER OPTIC COMBUSTION PRESSURE SENSOR

[76] Inventor: Marek T. Wlodarczyk, 6865 Vachon Dr., Bloomfield Hills, Mich. 48301

[21] Appl. No.: 09/297,114
[22] PCT Filed: Oct. 23, 1996
[86] PCT No.: PCT/US96/16973
   § 371 Date: Jun. 17, 1999
   § 102(e) Date: Jun. 17, 1999
[87] PCT Pub. No.: WO98/17988
   PCT Pub. Date: Apr. 30, 1998
[51] Int. Cl.$^7$ ............................... G01L 9/00; G01J 1/56; H01T 13/00
[52] U.S. Cl. ................. 73/705; 250/231.19; 313/119
[58] Field of Search .................... 73/705, 715, 718, 73/708; 250/227.24, 227.32, 231.19 R; 313/119, 118, 141, 143

[56] References Cited

U.S. PATENT DOCUMENTS

| | | | |
|---|---|---|---|
| 4,711,246 | 12/1987 | Alderson | 128/667 |
| 5,200,610 | 4/1993 | Zuckerwar et al. | 250/227.21 |
| 5,600,070 | 2/1997 | Wlodarczyk | 73/715 |

*Primary Examiner*—Harshad Patel
*Assistant Examiner*—Abdullahi Aw-Musse
*Attorney, Agent, or Firm*—James M. Deimen

[57] ABSTRACT

An optical pressure sensor assembly integrated with a spark plug (16) and spark plug boot (12). The pressure sensor comprises an optical fiber (34) with a pressure diaphragm (36) at the tip to sense pressure and pressure changes within the combustion chamber (32) of a spark ignition engine. A channel (30) is provided in the spark plug to hold the sensor. The diaphragm (36) of the sensor is located closer to the spark electrode than to the electric conductor which is encased by the boot (12). The optical fiber (34) is contained within a shaft that is routed through the boot (12) and into the channel (30). The optical fiber (34) is operatively and electrically connected to the vehicle's engine controller. The opto-electric connection to the vehicle's engine controller is made adjacent a coil (72) in the boot (12) or removed from the coil (72). The fiber (34) is surrounded by a nonmetallic shaft (22) outside the engine. Inside the spark plug (16), the shaft is metallic.

19 Claims, 3 Drawing Sheets

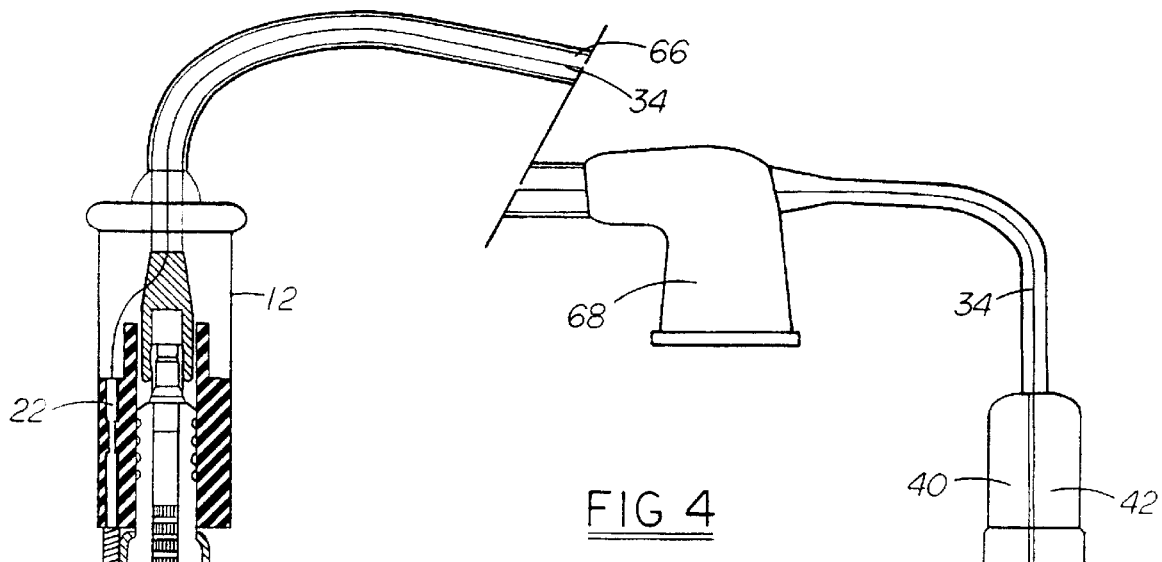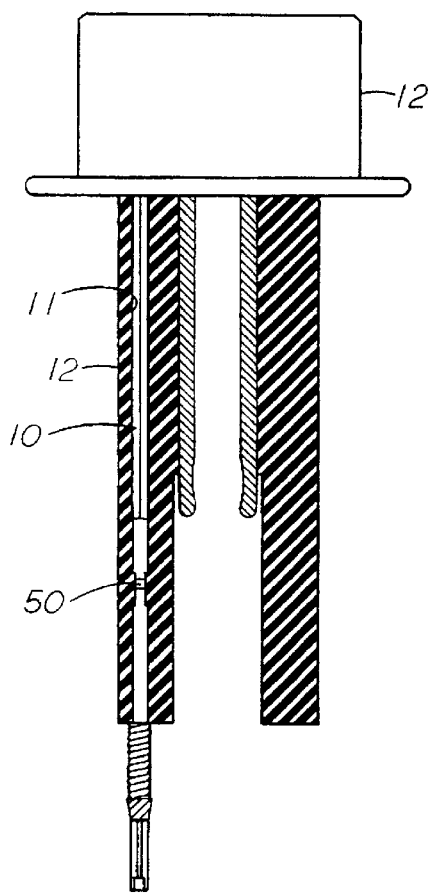

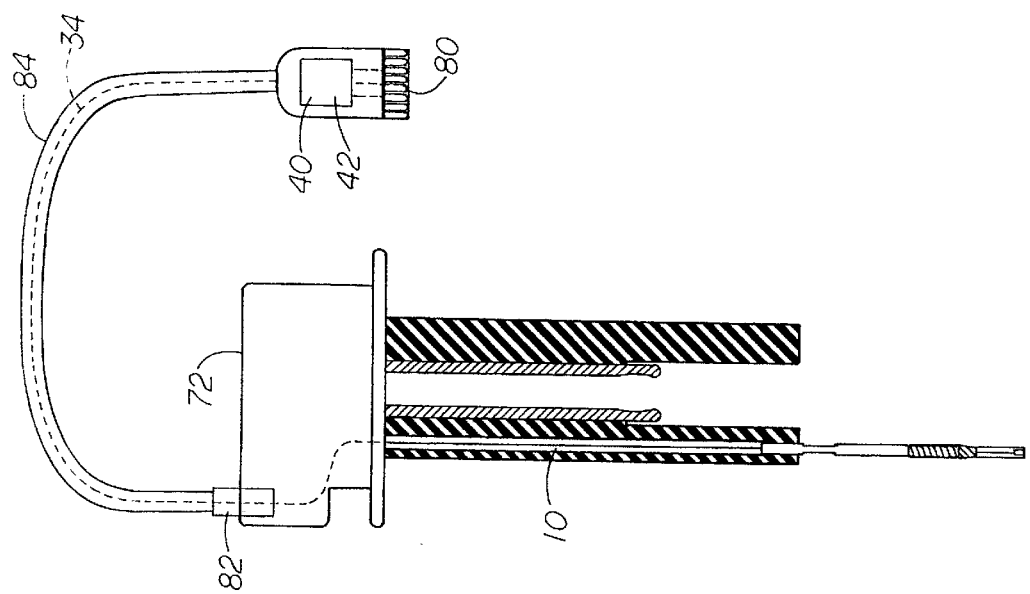
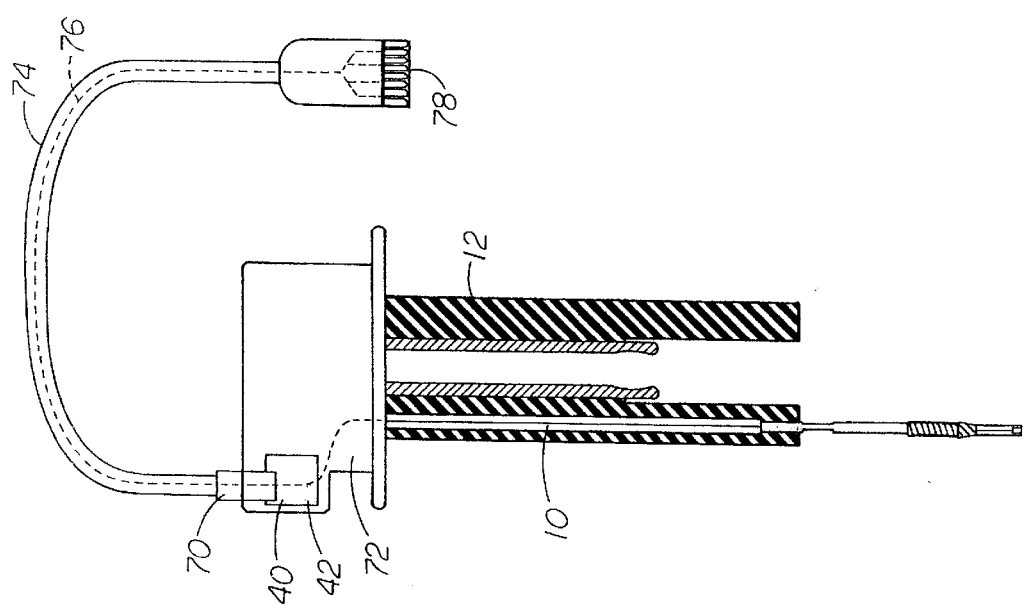

INTEGRATED FIBER OPTIC COMBUSTION PRESSURE SENSOR

My prior patent applications dealing with fiber optic pressure sensors integrated with spark plugs are Ser. No. 08/086,245, now U.S. Pat. No. 5,390,546 for Fiber Optic Diaphragm Sensors for Engine Knock and Misfire Detection; Ser. No. 08/390,970 for a Fiber Optic Combustion Pressure Sensor with Improved Long-Term Reliability; Ser. No. 08/392,315 for a Spark Plug Integrated Fiber Optic Combustion Pressure Sensor with an Integrated High Voltage Fiber Optic Connector; and PCT/US96/04637 for Fiber Optic Combustion Pressure Sensors for Engine Knock and Misfire Detection and are incorporated herein by reference.

BACKGROUND OF THE INVENTION

The field of the invention pertains to fiber optic sensors that are sensitive to pressure or stress in a manner that causes a beam of light to be reflectively modulated in response to changes in pressure or stress on the sensor. Determination of cylinder pressure and the sensors that report the pressure are currently sought by automotive manufacturers for engine control and monitoring applications. The desired product must be inexpensive and meet stringent quality, durability and reliability requirements. Additionally, the sensor package must be robust and easily routed for placement into an engine or engine head.

Ideally, the most desirable manner in which to introduce a pressure sensor into an engine is through an existing cylinder opening. By integrating a sensor with an existing device mounted into a cylinder hole, sensors can be introduced inexpensively into new engines as well as being provided for retrofit to engines already in use.

A spark plug represents a desirable device for integration with a pressure sensor as the spark plug partially enters the engine and thusly provides a preexisting opening into the engine. While special pressure measurement spark plugs have been used in engine research with expensive sensors, such research devices are not suitable for use in production engines. Fiber optic sensors are the best candidates for integration with a spark plug.

The small size of the sensor, the resistance to extreme temperatures, non-metallic construction and immunity to electromagnetic interference are the main advantages of fiber optic sensors over more conventional devices such as piezoelectric or piezoresistive devices.

SUMMARY OF THE INVENTION

The invention disclosed herein is an optical fiber diaphragm sensor that measures cylinder pressure before, at and after ignition of the combustion charge in combination with the spark plug and boot. Integration of the sensor to a boot surrounding the conductor of the spark plug and routing the optical fiber through the boot and cylinder pressure through a channel in the spark plug offers benefits. Effectively, the spark plug conductor is protected by the boot and the boot provides routing for the optical fiber.

The invention discloses a combustion pressure sensor integrated with a spark plug connector for applications in passenger car and industrial engines. In a preferred version, the sensor is non-electrical, such as a fiber optic. Spark plug modification and a novel sensor mounting technique are also described. This novel approach can be used with current ignition systems based upon a single coil or with multiple on-spark plug mounted coils.

The pertinent aspect of this novel technique is the installation of a pressure sensor into the spark plug. Rather than mounting the sensor into a spark plug first and then threading the spark plug into an engine head, the spark plug is threaded into the engine first (without the sensor), as is conventionally done. The sensor connector assembly is then pushed on in the same way as a conventional spark plug connector or an ignition coil connector combination is installed. The above-described technique provides a significant improvement over prior known techniques that require mounting a sensor into a spark plug first, then threading the spark plug into an engine head and finally installing separate electric high tension and sensor connectors onto the spark plug.

In the prior approach, a special installation tool is needed to achieve placement of the spark plug with the sensor attached thereto. Moreover, since the connectors are mounted close to the engine, problems can arise with high temperatures, Electro Magnetic Interference (EMI), and vibration.

During the installation process the sensor mounted at the end of a shaft, slides into a socket located in the spark plug body. Between the sealing collar and the sensor, the sensor shaft comprises metal, while beyond the collar, the sensor shaft comprises a durable plastic to prevent perturbation of the spark plug electric field. The sensor diaphragm communicates with the combustion cylinder via a pressure channel.

The pressure channel can be formed in the threaded shell of the spark plug. This channel is described in my prior filed patent applications. Alternatively, spark plugs with off-axis central electrodes can be used. As the spark plug connector latches onto the central electrode, the sensor's sealing collar is pushed into a receiving seat or socket at the end of the spark plug pressure channel.

A spring compresses the collar into the seat to maintain a pressure tight seal. For added protection against pressure leaks, an O-ring is mounted behind the collar. The plastic part of the shaft slides inside the modified connector body. For a fiber optic sensor, the spark plug's electric field is not disturbed because of the non-electric nature of the sensor. This is an important advantage over any electronic devices that would affect or be affected by an electric field due to the presence of metal components.

The sensor shaft is mounted substantially inside a modified boot for a high voltage ignition cable (conventional ignition systems). The boot is comprised of a high temperature-resistant, high-electrical breakdown material. Through an internal channel in the boot, the sensor cable enters the inside of a high voltage cable. In the case of an electrical sensor such as piezoelectric or piezoresistive, the cable requires careful shielding to avoid sensor damage or errors due to high voltage spikes.

In the case of a fiber optic sensor, the cable can be integrated together with the carbon strand of a high voltage cable. The sensor connector either interfaces directly to the Electronic Control Module (ECM) or is connected to the ECM through a hybrid optical/electrical connector, Application Specific Integrated Chip (ASIC).

The sensor can also be integrated with an ignition coil located over the spark plug as an alternative. The optical fiber can be terminated in the coil top with a hybrid connector. The sensor output is then sent to the ECM via an electric wire embedded in a multi-strand low-voltage cable.

The optic fiber can be terminated with an optical-only connector located on the top of the coil as a further alternative. In this case, a hybrid electrical-optical cable connects the coil/sensor package to the ECM. The sensor integrated with the coil can be implemented with a pencil-like coil mounted inside a spark plug well or coils located above the well and connected to the spark plug by an extension shaft.

The invention also comprises a process for inserting the sensor into a spark plug that is already placed in the engine. The process comprises routing an optical fiber having a pressure sensor on the end through a boot, the boot being subsequently attachable to a spark plug. The optical fiber extends beyond the boot and into a socket in the spark plug.

For a more complete understanding of the present invention, reference is made to the following detailed description when read in conjunction with the accompanying drawings wherein like reference characters refer to like elements throughout the several views.

DESCRIPTION OF THE DRAWINGS

FIG. 4 illustrates in cross-sectional view the fiber optic pressure sensor integrated with a boot;

FIG. 5 illustrates in cross-sectional view a modification to the fiber optic pressure sensor having the optical cable routed with the high voltage cable to the alternator connector and the optical cable continuing on to an opto-electrical and ASIC connector;

FIG. 6 illustrates in cross-sectional view the fiber optic pressure sensor having the opto-electronics and ASIC contained adjacent an ignition coil in the boot; and, FIG. 7 illustrates a cross-sectional view of the fiber optic pressure sensor having the opto-electronics and ASIC remote from the boot and the ignition coil.

DESCRIPTION OF THE PREFERRED EMBODIMENT

Figure 1:
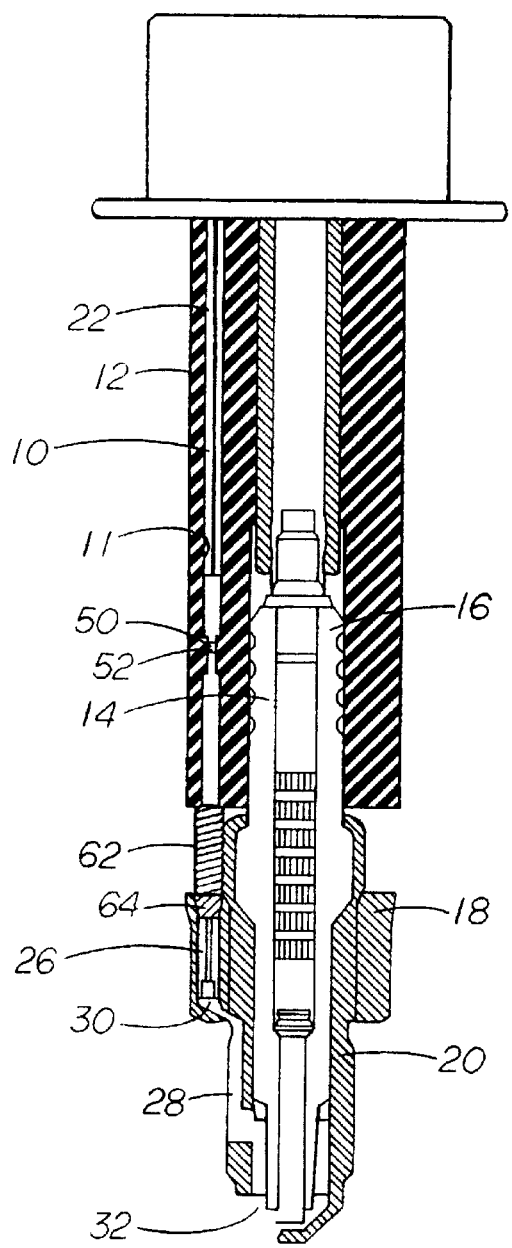
FIG. 1 illustrates in cross-sectional view a fiber optic pressure sensor inserted into a spark plug according to the invention.

In FIG. 1 the inserted pressure assembly denoted as 10 is shown. The pressure assembly 10 is mounted through an opening 11 in a boot 12, the boot 12 surrounding the external portion 14 of a spark plug 16. The spark plug 16 has a portion 20 that is insertable into an engine. The pressure assembly 10 has a shaft 22 of which the exterior is a non-metallic substance such as plastic. The shaft 22 is connected to a sensor housing 26 having a metal exterior. The sensor housing 26 of the shaft 22 is inserted into the portion 18 of the spark plug 16 that is nearest to the engine exterior. The portion 18 of the spark plug has a channel 30 therein to facilitate the placement of the sensor housing 26. The channel 30 is in fluid communication with a channel 28 in the portion 20 of the spark plug. Thus, the tip of the sensor housing 26 is in fluid communication with the combustion chamber 32 in the engine.

Figure 2:
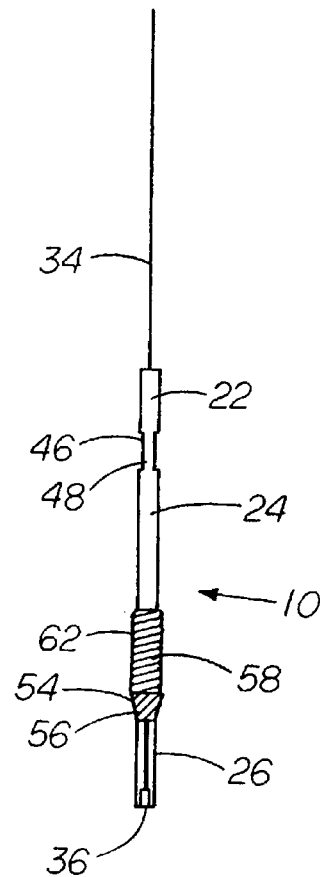
FIG. 2 illustrates in side view a partial cross-sectional view of the fiber optic pressure sensor insertable into a spark plug.

In FIG. 2, the pressure assembly 10 is separately shown. An optical fiber 34 runs through the pressure assembly 10 and is surrounded and protected by the sensor shaft 22. As described above, the sensor shaft is comprised of plastic and is affixed to the metal sensor housing 26. A sensor diaphragm 36 is affixed adjacent to the end of the optical fiber 34. The sensor diaphragm 36 responds to the pressure in the combustion chamber 32 and causes a change in optical signal through the optical fiber 30 which is passed to the opto-electronics 40, ASIC 42 and ultimately to the ECM 44.

(FIGS. 6 and 7 below) The sensor shaft 22 has means for retaining 46 the sensor shaft 22 in the boot 12. The means for retaining 46 comprise a pull retaining groove 48 in the sensor shaft 22 that is acted upon by a retaining clip 50 placed through an aperture 52 in the boot 12. (FIG. 1) Other means for retaining are also envisioned such as pins or adhesives.

Figure 3:
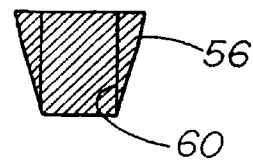
FIG. 3 illustrates a cross-sectional view of a brass sealing collar.

Means for sealing 54 the sensor shaft 22 maintain a pressure tight seal, eliminating a pressure drop within the combustion chamber 32 from leakage around the sensor housing 26. The means for sealing 54 comprise a sealing collar 56 and means for biasing 58 the means for sealing 54 the shaft. As shown in FIG. 3 the sealing collar 56 is a truncated brass cone having an aperture 60 therethrough to surround the sensor shaft 22 disposed therethrough. The means for biasing 58 comprises a spring 62 to urge the sealing collar 56 against a chamfer 64 in the channel 30 in the spark plug 16. The channel 28 in the spark plug 16 can have an open side in the portion 20. The insertion of the spark plug 16 into the engine causes the engine to provide the necessary side to completely form the channel 28 in the spark plug.

The pressure assembly 10 is shown in FIG. 4 as assembled into the boot 12 but without being joined to a spark plug. The pressure assembly 10 is routed through the opening 11 in the boot 12 with the clip 50 engaging the retaining groove 48 in the shaft 22.

FIGS. 5–7 depict the integration of the sensor with the engine's electronics as discussed above. The sensor shaft 22 can be mounted inside the boot of a high voltage ignition cable of a conventional ignition system as shown in FIG. 5. The optical cable 34 from the sensor is routed with the high voltage cable 66 to the distributor connector 68. At the distributor connector 68 the optical cable 34 continues independently to the opto-electrical 40 and ASIC 42 connector.

FIG. 6 shows the optical fiber terminating at the opto-electronics 40 and the ASIC 42 which are located adjacent the spark plug boot mounted coil 72 as a part of the boot and coil combination. An electrical connector 70 for both the primary wire 74 and pressure sensor wire 76 lead to a plug 78 for an ECM. The hybrid connector 82 provides for the primary wire 84 and optical fiber 34 that lead to the multiple electrical connector 80. In FIG. 7, the opto-electronics 40 and the ASIC 42 are located remotely from the spark plug boot mounted coil 72 as part of a multiple electrical connector 80.

Having described the invention, many modifications thereto will become apparent to those skilled in the art to which it pertains without deviation from the spirit of the invention as defined in the appended claims.

What is claimed is:

1. An integrated pressure sensor assembly for use with a spark plug, the spark plug having a portion insertable into an engine and a portion external to the engine, the spark plug having a channel formed therein, the channel extending into the portion of the spark plug insertable into the engine, the pressure sensor assembly comprising a boot having an aperture therethrough, the boot being removably attachable to the spark plug portion external to the engine, and an optical fiber having an end and an optical pressure sensor attached to the end, the optical fiber being permanently positioned through the aperture of the boot and removably insertable into the channel in the spark plug.

2. The integrated pressure sensor assembly according to claim 1 further comprising a shaft surrounding the optical fiber.

3. The integrated pressure sensor assembly according to claim 2 wherein part of the shaft surrounding the optical fiber is comprised of a non-metallic material.

4. The integrated pressure sensor assembly according to claim 3 wherein the part of the shaft being non-metallic material surrounding the optical fiber is permanently fittable into the aperture in the boot.

5. The integrated pressure sensor assembly according to claim 2 further comprising means for sealing the shaft in the channel.

6. The integrated pressure sensor assembly according to claim 5 wherein the means for sealing the shaft comprise a truncated cone having an aperture therethrough, and means for resiliently biasing the truncated cone against the channel in the spark plug.

7. The integrated pressure sensor assembly according to claim 6 wherein the truncated cone comprises brass.

8. The integrated pressure sensor assembly according to claim 2 further comprising means for retaining the pressure sensor in the spark plug within the engine.

9. The integrated pressure sensor assembly according to claim 8 wherein the means for retaining comprise a pull retaining groove disposed in the shaft, and a pull retaining clip insertable through an aperture in the boot to engage the pull retaining groove of the shaft.

10. The integrated pressure sensor assembly according to claim 1 wherein the optical sensor comprises an optical diaphragm.

11. The integrated pressure sensor assembly according to claim 1 wherein a signal generated by the optical pressure sensor is routed by an optical connector to an ECM.

12. The integrated pressure sensor assembly according to claim 11 wherein the ignition coil is attached to the boot.

13. The integrated pressure sensor assembly according to claim 12 wherein the signal generated by the optical pressure sensor is routed by an optical connector to an ASIC adjacent an ignition coil attached to the boot.

14. The integrated pressure sensor assembly according to claim 11 wherein the signal generated by the optical pressure sensor is routed by an optical connector to an ASIC remote from an ignition coil attached to the boot.

15. An integrated fiber optic pressure sensor for measuring the instantaneous pressure within a combustion chamber, the pressure created from the ignition by a spark plug of a charge contained in the chamber, the spark plug having a conductor and an electrode, the electrode creating the spark within the chamber, the conductor of the spark plug being attachable to a boot, the pressure sensor comprising an optical fiber permanently positioned in said boot, and an optical sensor connected to the end of the optical fiber, the optical sensor being; positionable in the spark plug simultaneous with attachment of the spark plug to the boot.

16. In a fiber optic pressure sensor for use in combination with a spark plug insertable into an engine, the spark plug having at least an electrode, a channel and a conductor, the sensor comprising an optical fiber insertable in the channel, an optical pressure diaphragm attached to an end of the optical fiber, the diaphragm being moveable in response to changes in fluid pressure exerted upon the diaphragm, and a boot removably attached to the spark plug conductor and permanently holding the optical fiber, the optical fiber being insertable and removable from the channel at will with attachment and removal of the boot from the spark plug.

17. A method for inserting a pressure sensor into a spark plug body, the spark plug having an electrode, a conductor and a channel, a portion of the spark plug being inserted into an engine, the method comprising the steps of placing an optical fiber having a shaft surrounding the optical fiber, the optical fiber terminating with an optical sensor, into and through a boot, a portion of the optical fiber permanently extending beyond the boot, positioning the boot onto the conductor of the spark plug, the conductor of the spark plug extending outside of the engine, and simultaneously positioning the shaft surrounding the optical fiber into alignment with the channel of the spark plug and inserting the shaft into the channel.

18. The method for inserting a pressure sensor into a spark plug body according to claim 17 wherein the optical sensor is emplaced into the channel in the spark plug body at a location spaced from the ends of the channel.

19. A method for mounting an optical fiber pressure sensor into a spark plug comprising the steps of routing an optical fiber having a pressure sensor at the end of the optical fiber permanently through a boot, the boot removably emplaceable to surround a portion of a spark plug external to an engine, and emplacing the pressure sensor extending beyond the boot within a channel near a spark generating portion of the spark plug upon emplacement of the boot on the spark plus.

* * * * *